Patented Dec. 16, 1947

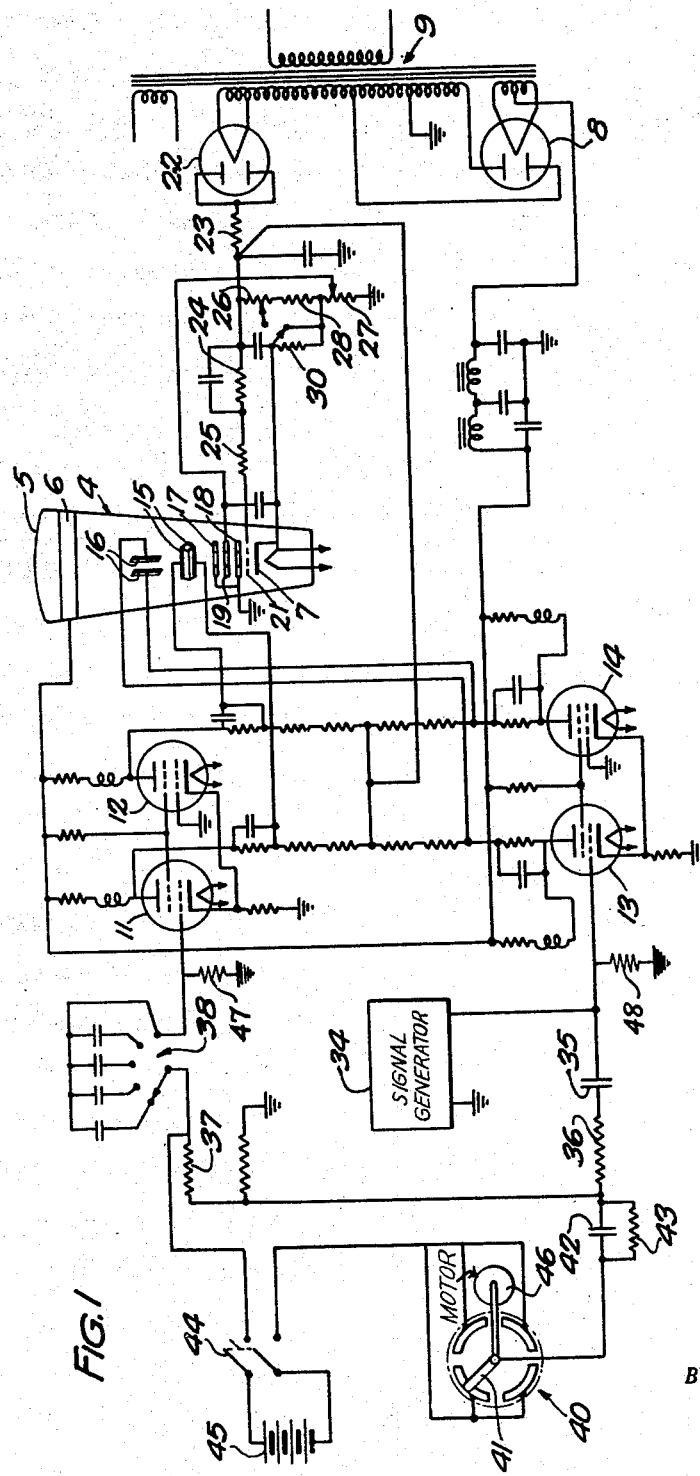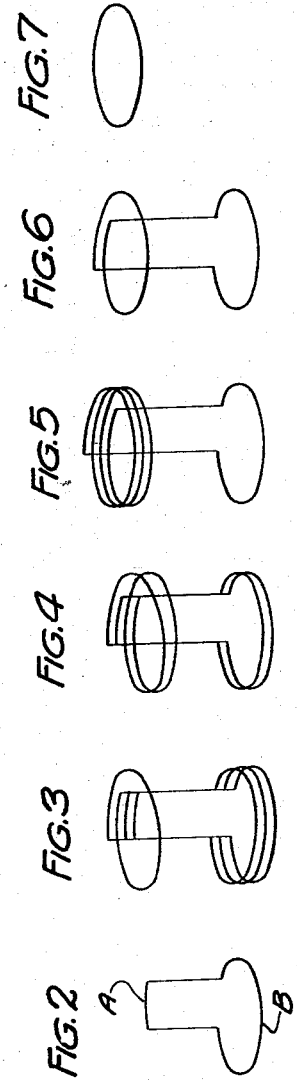

2,432,944

UNITED STATES PATENT OFFICE 2,432,944

OSCILLOGRAPH SYSTEM FOR TESTING ELECTRICAL CONTACT MAKING DEVICES

Harry R. Shillington, Oak Park, Ill., assignor to Western Electric Company, Incorporated, New York, N. Y., a corporation of New York Application August 28, 1943, Serial No. 500,356

4 Claims. (Cl. 175—183)

This invention relates to testing apparatus and more particularly to an apparatus for testing electrical contact devices.

In the testing of electrical contact devices, a plurality of signal lamps may be used to indicate the effectiveness of the various contacts. However, when such contacts are made and interrupted in a test at the high frequency at which they occur in normal operation, the periods of make and break may be too short to be indicated by signal lamps.

An object of the present invention is to provide a testing apparatus producing a persistent visual pattern to indicate the condition of an electrical device under test.

In accordance with one embodiment of the invention, a testing apparatus is provided having an oscillograph in which the electron beam is deflected at a frequency corresponding to the frequency of make and break of an electrical contact device under test and the deflection of the beam along one axis is modified in accordance with the conditions of the various contacts to produce persistent visual patterns individual to the conditions being tested for.

Other objects and advantages will appear from the following description taken in conjunction with the accompanying drawings, in which Fig. 1 is a diagrammatic view of an apparatus embodying the invention; and Figs. 2 to 7 illustrate various visual patterns indicating different conditions in the devices being tested.

Referring to Fig. 1, a cathode ray oscillograph is there illustrated including a cathode ray tube 4 provided with a fluorescent screen 5 having a band electrode 6 which may be energized positively relatively to a cathode 7 by a full wave rectifier 8 connected to a transformer 9. This rectifier may also provide anode current for tubes 11, 12, 13 and 14 which are preferably of the tetrode type and are used to amplify the energy being analyzed to the required degree.

A pair of deflector plates 15 of the cathode ray tube 4 are connected to the anode circuits of tubes 11 and 12 to impart a vertical deflection along the Y axis to the cathode ray beam. Similarly, deflector plates 16 are connected to the anode circuits of tubes 13 and 14 to impart a horizontal deflection along the X axis of the cathode ray beam.

The cathode ray tube is also provided with a pair of accelerating electrodes 17 and 18 and a focusing electrode 19. Energy is supplied to the focusing electrode or grid 19, as well as to a second grid 21, or modulating electrode, through a rectifier 22, also connected to the transformer 9. The anode circuit of the rectifier 22 is connected to the modulating grid 21 through three resistors 23, 24 and 25, and the cathode 7 is supplied with a biasing potential from this circuit through potentiometer resistors 26 and 27 and fixed resistors 28, 29 and 30.

The oscillograph circuit thus far described is substantially conventional and, therefore, greater detail of description is deemed unnecessary. Using this oscillograph in accordance with the present invention, signals are applied to the X and Y axes of the cathode ray tube 4 through the input grids of the tubes 11 and 13 to obtain a pattern on the screen 5 substantially approximating in shape an ellipse. Such a pattern is obtained when the two signals applied to the tube 4 are approximately 135° out of phase. This pattern is then modified by the conditions of the circuit being tested, as well be explained hereinafter. Instead, however, of employing separate devices to obtain the two signals required to form this pattern, a single signal generator 34, such as an audio oscillator, is employed. As shown in Fig. 1, one output terminal of this oscillator is grounded while the other output terminal is connected to the grid of the tube 13 and to one end of a resistor 48 whose other end is connected to ground. A portion, however, of the signal supplied to the tube 13 is passed through a resistance capacitance network comprising a condenser 35, resistors 36 and 37 and a second condenser selected from a group 38 of four connected to the input grid of the tube 13 and to the ungrounded end of a grounded resistor 47, in such a manner that a portion of the sine wave of the audio oscillator as applied to the vertical and horizontal deflector plates of the oscillograph will be substantially 135° out of phase with the rest of the wave. The resultant pattern on the oscillograph screen is, therefore, an ellipse such as shown in Fig. 7. The number of condensers in the group 38 is, of course, optional. However, four condensers, having a range from .005 mfd. to .03 mfd. have been found to be sufficient for most purposes.

As stated hereinbefore, this elliptical pattern may be modified, in accordance with the present invention, by the conditions of the circuit being tested to indicate these conditions. The present apparatus is particularly designed to test electrical contact devices such as a four-contact switch 40 shown in Fig. 1. The switch shown is of the distributor type and is designed to make and break a number of circuits as a contact arm 41 is rotated by a motor 46, the switch breaking one circuit before making the next. In such a switch, it may be necessary that the length of each set of contacts be known exactly, as well as the condition of the contacts. As shown, the rotary contact arm is connected through a condenser 42 having a resistor 43 connected thereacross to one side of the oscillator circuit and the four contacts of the switch are connected together and, by closing a double pole single throw switch 44, may be connected through a battery 45 to the other side of the oscillator circuit and to the input of the tube 11.

It will be apparent from the foregoing that if an elliptical pattern is being traced on the screen 5 of the cathode ray tube 4 as a result of the signals supplied from the audio oscillator 34 and associated phasing network, then, if an additional voltage is applied to the vertical deflector plates, the cathode ray beam will be instantly deflected and will tend to trace the elliptical pattern in a new area either above or below the area of the screen 5 in which the pattern was previously traced, depending on the polarity of the voltage applied to vertical deflector plates. If the additional voltage applied to the vertical plates is constant, then the pattern will be completed in the new area. If, on the other hand, the additional voltage is not constant, but rather is uniformly intermittent, then only a portion of the pattern will be traced in the new area and the rest will be traced in the former area. This is the condition indicated in Fig. 2. Here an additional voltage has been applied for a major portion of the time required to trace the pattern. The portion of the pattern designated A is that portion traced while no voltage is applied from the battery 45, while the portion of the pattern designated B is that portion which is traced when voltage is applied from this battery. The voltage applied from the battery 45 is, of course, selected to provide the desired deflection.

In the switch 40 shown in Fig. 1, four sets of contacts are provided. For present purposes, it will be assumed that the contacts are equally spaced and are of equal length and that the rotary contact arm 41 opens one set of contacts before closing the next. Thus, each time a set of contacts is closed, the switch 44 also being closed, the circuit to the battery 45 is completed and a pulse of current is applied to the vertical deflector plates, causing thereby a deflection of the cathode ray beam. If the frequency of the signal supplied from the audio oscillator 34 in cycles per second were the same as the speed of rotation in revolutions per second of the switch, then if the contacts were operating properly, it will be apparent that the pattern being traced in accordance with the signal from the audio oscillator would be displaced at four points. If one or more sets of contacts were not operating properly, then instead of being displaced at four points, the pattern would be displaced at a number of points equivalent to the number of sets of contacts which are operating properly.

In accordance with the present invention, however, it has been found desirable to adjust the audio oscillator 34 to supply a signal having a frequency which will be equal to the number of contacts multiplied by the number of revolutions made by the switch per second. In this way, instead of showing a displacement of the elliptical pattern at four points, the pattern will show a displacement at only one point, as shown in Fig. 2, when the switch is operating properly. If a switch having eight sets of contacts were used, then the audio oscillator would be adjusted to supply a signal which would have a frequency eight times the number of revolutions made by the switch per second.

In the present case, if the arm 41 of the switch 40 is rotated at a speed of 25 rotations per second, 100 pulses per second will be applied from the battery 45 to the vertical deflector plates. The audio oscillator 34 will, therefore, be adjusted to supply a signal having a frequency of 100 cycles per second. If the switch is operating properly, a pattern such as that shown in Fig. 2 will be formed on the screen of the cathode ray tube.

Figs. 3, 4, 5, 6 and 7 illustrate the pattern formed when the switch 40 is not operating properly. In Fig. 3, one set of contacts remains open and three contacts are closed at the regular intervals. In Fig. 4, two adjacent sets of contacts are open and two adjacent sets of contacts are closing properly. In Fig. 5, three sets of contacts are remaining open and one set of contacts is closing properly. It will be noted that in these three patterns, four ellipses are traced instead of one having a portion thereof displaced as in Fig. 2. Three of these ellipses are relatively closely positioned whereas the fourth ellipse is substantially displaced from the others. The spacing of the three ellipses appears to be due primarily to the irregularity in the charging and the discharging rate of the capacitance resistance network associated with the testing circuit. The spacing of the three ellipses is controlled by varying the capacitance of the network and particularly by selecting a condenser from the group 38 of four condensers. Changing the value of the capacitance in the network will spread or compress the spiral ellipse accordingly as it is increased or decreased.

Fig. 6 indicates the pattern obtained when one alternate set of contacts is making and the other alternate set is not making. It will be noted that since the charging and discharging of the condensers is then at a uniform rate, no spreading of the elliptical patterns occurs. When no contacts are making, the pattern formed is that shown in Fig. 7.

While this invention has been shown and described in connection with the testing of a four-contact switch in which one set of contacts is broken before the next is made, this invention is equally useful in testing many other types of electrical contact devices including multi-contact switches in which the preceding set of contacts is not broken until the succeeding set has been made.

What is claimed is:

1. In an apparatus for testing electrical contact devices normally making a predetermined number of contact closures per unit time, an oscillograph having a pair of horizontal and a pair of vertical deflector plates and a cathode ray screen, a signal generating device having a signal output connected to one of said pairs of deflector plates of said oscillograph, said signal generating device having a periodic output with a frequency per unit of time equal to the number of contact closures normally made during the same unit of time by a contact device to be tested, a phasing network associated with said signal generating device and connected between the signal output of said signal generating device and the other pair of said deflector plates for applying a signal on said other pair of deflector plates out of phase with the signal applied on said one pair of deflector plates so as to form an elliptical pattern on the screen of the oscillograph, a source of deflecting voltage connected to one set of deflector plates through the device being tested, and a capacitance resistance network connected between the device being tested and said one set of deflector plates, said network being adapted to be charged by said signal generating device and by said source of deflecting voltage thereby to apply modifying potentials to said one set of deflector plates in accordance with and indicative of the number of contact closures being made by said device.

2. In an apparatus for testing electrical contact devices normally having a predetermined number of contact closures per unit time, an oscillograph having a pair of horizontal and a pair of vertical deflector plates and a cathode ray screen, a signal generating device connected to one set of said deflector plates of said oscillograph, said signal generating device having a periodic output with a frequency per unit of time equal to the number of contact closures normally made during the same unit of time by a contact device to be tested, a phasing network associated with said signal generating device and connected between said signal generating device and the other set of said deflector plates to cause the signal applied thereby to form an elliptical pattern on the screen of the oscillograph, a capacitance-resistance network connected to one set of said deflector plates, a source of deflecting voltage connected to said device being tested and adapted to apply upon contact closure of the device being tested a modifying potential to one set of deflector plates through said capacitance resistance network thereby charging said network, a portion of the pattern on said oscillograph screen being shifted along one axis in accordance with the charging and discharging of the network, and means associated with said network for varying the rate of charging and discharging of said network.

3. An apparatus for testing electrical contact devices normally having a predetermined number of contact closures per unit time comprising an oscillograph having vertical deflecting means, horizontal deflecting means and a screen, a capacitance-resistance network having one end connected to one of said deflecting means, an electrical oscillator connected to the other of said deflecting means, a phase shifting means having one end connected to the other end of said network, the other end of said phase shifting means being connected to said oscillator, a source of electrical energy, and means for connecting said source of electrical energy through a contact device under test to said other end of said network to additively energize said one deflecting means in accordance with the time and conditions of the closure of the contacts of said contact device.

4. An apparatus for testing electrical contact devices normally having a predetermined number of contact closures per unit time comprising a cathode-ray oscillograph having vertical deflecting means and horizontal deflecting means and a cathode-ray screen, an electrical signal generating device connected to one of said deflecting means for energizing said one deflecting means, said signal generating device having a periodic output with a frequency per unit of time equal to the number of contact closures normally made during said unit of time by a contact device to be tested, a phase shifting means connected between said signal generating device and the other of said deflecting means for energizing said other deflecting means, said phase shifting means having the proper circuit parameters to cause an elliptical signal pattern to appear on said screen, a capacitance-resistance network interposed between said generator and one of said deflecting means, a source of electrical energy, and means for connecting said source of electrical energy through said contact device under test to one of said deflecting means through said capacitance-resistance network for modifying the potentials on the last said deflecting means in accordance with the time and conditions of the contact closure of said contact device to shift a portion of said signal pattern representing the time of contact closure along one axis.

HARRY R. SHILLINGTON.

REFERENCES CITED

The following references are of record in the file of this patent:

UNITED STATES PATENTS

| Number | Name | Date |
| --- | --- | --- |
| 2,154,379 | Estes | Apr. 11, 1939 |
| 2,212,634 | Buckingham | Aug. 27, 1940 |
| 2,205,173 | Peterson | June 18, 1940 |
| 2,275,460 | Page | Mar. 10, 1942 |
| 2,207,513 | Hadfield | July 9, 1940 |

OTHER REFERENCES

Watt, Application of the Cathode Ray Oscillograph in Radio Research, H. M. Stationery Office, London, 1935, pages 81-82.